United States Patent [19]

Stillwagon

[11] 4,271,369
[45] Jun. 2, 1981

[54] HOMOPOLAR MACHINE FOR REVERSIBLE ENERGY STORAGE AND TRANSFER SYSTEMS

[75] Inventor: Roy E. Stillwagon, Ruffsdale, Pa.

[73] Assignee: The United States of America as represented by the United States Department of Energy, Washington, D.C.

[21] Appl. No.: 876,817

[22] Filed: Feb. 10, 1978

Related U.S. Application Data

[63] Continuation-in-part of Ser. No. 585,642, Jun. 10, 1975, Pat. No. 4,110,648.

[51] Int. Cl.² .......................................... H02K 31/00
[52] U.S. Cl. .................................... 310/178; 310/219; 310/232
[58] Field of Search .................... 310/178, 10, 40, 52, 310/71, 219, 143, 127, 232, 112, 113, 114, 102, 127–135, 102 A, 107, 240, 243, 245; 322/4, 48; 318/253

[56] References Cited

U.S. PATENT DOCUMENTS

| | | | |
|---|---|---|---|
| 3,383,532 | 5/1968 | Zeisler | 310/102 |
| 3,846,653 | 11/1974 | Korotenko | 310/102 |
| 3,944,865 | 3/1976 | Jewitt | 310/178 |
| 4,034,248 | 7/1977 | Mole | 310/178 |
| 4,041,337 | 8/1977 | Mole | 310/178 |

Primary Examiner—R. Skudy
Attorney, Agent, or Firm—J. R. Campbell; Z. L. Dermer

[57] ABSTRACT

A homopolar machine designed to operate as a generator and motor in reversibly storing and transferring energy between the machine and a magnetic load coil for a thermo-nuclear reactor. The machine rotor comprises hollow thin-walled cylinders or sleeves which form the basis of the system by utilizing substantially all of the rotor mass as a conductor thus making it possible to transfer substantially all the rotor kinetic energy electrically to the load coil in a highly economical and efficient manner. The rotor is divided into multiple separate cylinders or sleeves of modular design, connected in series and arranged to rotate in opposite directions but maintain the supply of current in a single direction to the machine terminals. A stator concentrically disposed around the sleeves consists of a hollow cylinder having a number of excitation coils each located radially outward from the ends of adjacent sleeves. Current collected at an end of each sleeve by sleeve slip rings and brushes is transferred through terminals to the magnetic load coil. Thereafter, electrical energy returned from the coil then flows through the machine which causes the sleeves to motor up to the desired speed in preparation for repetition of the cycle. To eliminate drag on the rotor between current pulses, the brush rigging is designed to lift brushes from all slip rings in the machine.

5 Claims, 8 Drawing Figures

VOLTAGE AND CURRENT VS. TIME

FIG.7

HOMOPOLAR MACHINE FOR REVERSIBLE ENERGY STORAGE AND TRANSFER SYSTEMS

GOVERNMENT CONTRACT

The invention described herein was made in the course of or under Subcontract No. LN4-44177, between Los Alamos Scientific Laboratory and Westinghouse Electric Corporation.

This application is a Continuation-in-Part of Application Ser. No. 585,642, filed June 10, 1975, now U.S. Pat. No. 4,110,648 and assigned to the same assignee as the present invention.

BACKGROUND OF THE INVENTION

The invention described herein relates to dynamoelectric machines and more particularly to a homopolar generator-motor useful in reversibly storing and transferring energy in a thermo-nuclear reactor power generation system.

Homopolar machines conventionally are designed to produce high current, low voltage power to loads demanding very large direct currents, such as that required in metallurgical or research applications. Because the machine armature moves in a field of unchanging polarity, it generates DC power without the need for commutation, and it is this characteristic which makes the generator particularly attractive in supplying very large pulses of direct current to connected loads.

One such load represented by a fusion reactor, operates on the principle of plasma heating and confinement which requires high energy storage and transfer systems. These systems act to rapidly pulse the reactor magnetic field or load coils which compress and confine the plasma as the energy is transferred between the electrical power source and reactor load coils. Should the power source comprise a homopolar machine, the machine must operate at unusually high power densities, and the energy pulses must be transferred under very low loss conditions and in extremely short time periods, e.g., in tens of milliseconds. This energy transfer time represents the ratio of stored energy in the machine to the average power level during the pulse. In conventional homopolar machines, the ratio or transfer time, is two orders of magnitude greater than the short time requirements established for efficiently pulsing the magnetic load coils of fusion reactors.

Consideration has been given to the use of conventional homopolar machines to pulse the reactor load coils to achieve the desired reactor performance. In such an arrangement, the homopolar machine is connected to the fusion reactor load coils through a series switch and when the machine current reaches the desired value and is transferred to the coil, a shunt switch across the coil is closed to short it through a low resistance path and thus confine the current to the coil. However, at this particular instant in the cycle, voltage will still appear on the rotor winding because the mass represented by the machine rotor will cause the rotor to continue rotating. It is apparent that as rotor rotation continues with the field winding energized, the rotor conductors cut flux and continue to generate a voltage until the rotor stops.

Therefore, at the instant the shunt switch is closed, it also is necessary to open the series switch and disconnect the homopolar machine from the load to prevent its rotor from being shorted by the shunt switch. Since a high DC current at high voltage is still on the machine, it is evident that an extremely large interrupting series switch would be required to open the circuit. If such a switch could be designed, the loss of energy associated with the interruption would nevertheless be so great that it would not be compatible with the efficiency requirements for the system. For these reasons conventional homopolar machines cannot effectively satisfy fusion reactor load coil requirements because the machine design and characteristics preclude matching the energy stored in the machine with the energy to be transferred to the reactor load coils.

SUMMARY OF THE INVENTION

Briefly stated, the present invention eliminates the above disadvantages by providing a homopolar generator-motor which generates and stores energy as rotational kinetic energy, delivers the energy electrically to a magnetic load coil and then acts as a motor to accept electrical energy from the magnetic load coil to accelerate the rotor and again store kinetic energy before repeating the next cycle. The homopolar generator-motor includes a stator enclosing a rotor divided into separate rotor modules which rotate in opposite directions. Each module is of hollow sleeve or shell construction having a radially thin shell wall and mounted for rotation on appropriate bearings. Excitation coils concentrically disposed around the stator near the ends of each rotor module provide the flux system necessary for generating very large direct currents.

This current is removed from the machine and transferred through a switch to magnetic load coils peripherally wound on a core used in the fusion reactor. A shunt switch across the load coil provides a low resistance path for the circulation of current through the coils during the time plasma is being confined. The coil energy returned to the homopolar machine causes it to act as a motor to again store the kinetic energy needed in the system. Additional current from a remote source may be added to supplement that returned from the coils to thus bring the rotor up to its design speed. An important consideration in the design resides in selecting machine proportions such that the energy stored will match the amount of current transferred to the magnetic load coils.

An object of the invention therefore is to provide an efficient and economical homopolar machine wherein the energy stored in the machine substantially matches on a 1 to 1 basis, the amount of energy to be transferred to a load.

Another object of the invention is to provide an economical and efficient homopolar machine which stores energy and reversibly transfers such energy frequently and rapidly with less than ten percent energy loss in the system.

Another object of the invention is the provision of a homopolar machine having a multiple segmented rotor wherein adjacent rotor modules rotate in opposite directions.

Another object of the invention is to provide a homopolar generator-motor which acts as a generator to provide energy to a connected load, and as a motor which receives energy from the load during the second part of each cycle.

BRIEF DESCRIPTION OF THE DRAWINGS

While the specification concludes with claims particularly pointing out and distinctly claiming the subject matter of the invention, it is believed the invention will be better understood from the following description taken in connection with the accompanying drawings wherein:

DESCRIPTION OF THE PREFERRED EMBODIMENT

To help facilitate an understanding of the invention, the homopolar generator-motor described herein is designed for use with high energy storage and transfer systems.

The energy source is a homopolar generator-motor designed to store energy as rotational kinetic energy, generate to deliver the energy electrically to a magnetic load coil, and then motor to accept the electrical energy from the magnetic load coil and again store kinetic energy. The machine proportions are such that the kinetic energy stored matches the amount of electrical energy to be transferred to the load. To rapidly transfer current at high efficiency, this design requires a departure from conventional homopolar machine construction, and in principle, a departure from any conventional motor or generator.

In principle, the highest efficiency is obtained in the rotating element when 100% of the rotor mass is utilized as an electrical conductor. Any dead weight, such as that found in a prior art laminated or solid iron core of a conventional rotor, contributes to the mass, the inertia and the stored rotational energy and it is this mass which reduces system efficiency. To achieve great efficiency, in contra-distinction with the prior art, substantially all of the rotor mass serves as the conductor which makes it possible to transfer almost all of the developed kinetic energy electrically to a load.

Nuclear fusion reactor power plants are illustrative of the systems which require large magnitudes of power and the invention will be described in relation to such systems, but it will be evident as the description proceeds that it is applicable to other types of systems requiring large pulses of power for extremely short time periods. The specific type of power plant chosen to illustrate application of the invention consists very generally of a torus of cylindrical configuration having a magnetic field coil, called a compression or load coil, wound helically in sections on its outer peripheral surface. The torus contains a gas or plasma which is compressed and confined as the compression or load coil is periodically pulsed from a high energy source, such as the homopolar generator-motor. After pulsing, energy remaining in the coil field is reversibly transferred to the energy source to again repeat the pulsing cycle.

Figure 1:
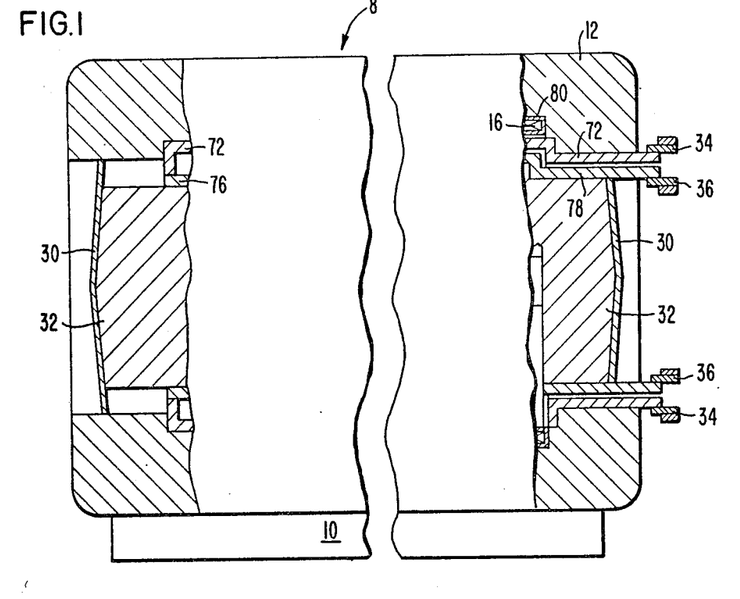
FIG. 1 is a view in elevation, partly in section, of a homopolar generator-motor made in accordance with the teachings of this invention.
Figure 2:
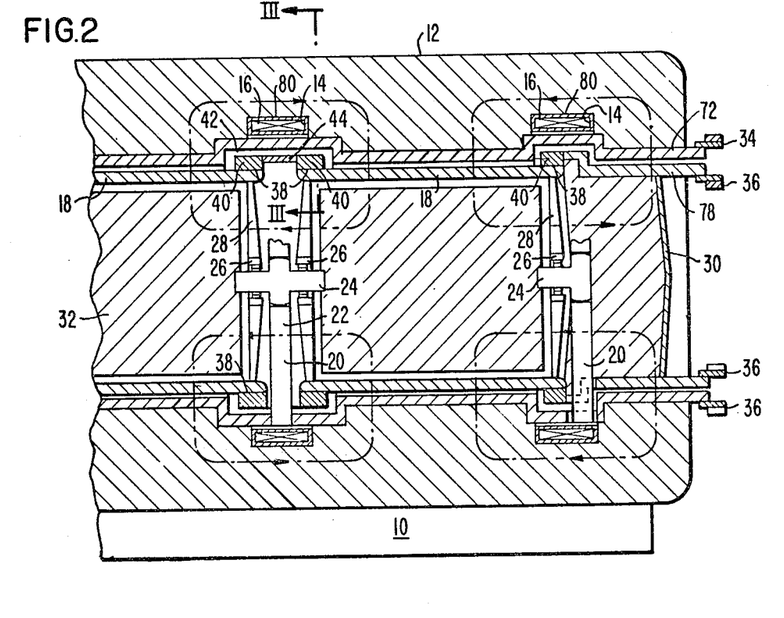
FIG. 2 is a view on elevation, partly in section, of the homopolar generator-motor partially illustrating the arrangement of rotor modules and the flux path provided by the stator excitation windings.

Referring now to the drawings wherein like reference characters designate like or corresponding parts throughout the several views, there is shown in FIGS. 1 and 2, a homopolar generator-motor arranged to utilize six modules which operate electrically in series to develop, for example, 10 kilovolts.

The machine 8 comprises a base 10 supporting a stator 12 of solid iron, and depending on the machine length, may be assembled in sections, if desired. Channels 14 formed on its inner peripheral surface receive excitation field windings 16. As shown in FIG. 2, the rotating element in the machine consists of multiple, hollow aluminum sleeves or hollow cylinders 18 having an unbroken outer peripheral surface. These sleeves are modular in construction, and the machine shown to illustrate the invention includes six modules disposed along the machine length.

Each sleeve is supported for rotation in the stator by pedestals 20 secured at their base in the iron stator and include an upstanding bearing support 22 which terminates in axially directed bearings journals 24. Each journal extends into the end of adjacent sleeves 18 as shown. In an alternative arrangement, not shown, the sleeve hubs may be mounted on a single shaft supported from the base at opposite ends of the machine and arranged to extend centrally therethrough. Long shafts used with large machines desirably should be supported from the base at intervals along the shaft length. Hubs 26 mounted for rotation on the journals include radially extending support arms 28 which are welded or otherwise affixed to the inner surface of each sleeve. The support arms 28 may be made of aluminum, steel or other metallic or nonmetallic material having a high strength to weight ratio, the highest ratio being most desirable because of the need to minimize weight in the rotating sleeves. Since no mechanical power is transmitted to or extracted from the rotating sleeves, and because the sleeves do not contain conventional slot conductors, no additional structural members are required to absorb electrical and centrifugal forces imposed on the sleeve during operation. Also, to reduce frictional drag, the hub 26 may be mounted on hydrostatic bearings in lieu of sleeve or rolling element bearings. In that case, air for jacking and/or maintaining each sleeve off its journal is supplied from a source through air passages formed in the pedestals 20.

Depending on the conducting material comprising each sleeve, the mean radius to wall thickness ratio should be in the neighborhood of 10:1, the diameter in the specific illustration being two meters with a ten centimeter wall thickness. This design permits a low ratio of stored kinetic energy to electrical power rating (watt-seconds per watt) while maintaining high electrical utilization of the aluminum sleeve, which is fundamental in minimizing joule losses.

It will be noted that a single bearing pedestal and support arms 28 located on opposite ends of the machine support the outermost sleeve modules. Closure plate 30 sealed in opposite ends of the machine permits charging the space therein with a low density gas for minimizing windage and friction losses during sleeve rotation.

To provide a low reluctance path in the machine for flux produced by the excitation coil 14, a stationary solid iron core 32 preferably is positioned inside each rotating sleeve 18. The iron core is supported from stationary journals 24 extending outwardly from the bearing pedestal 20 and its outer surface is spaced from the sleeve 18 inner surface to permit free sleeve rotation during machine operation.

Figure 3:
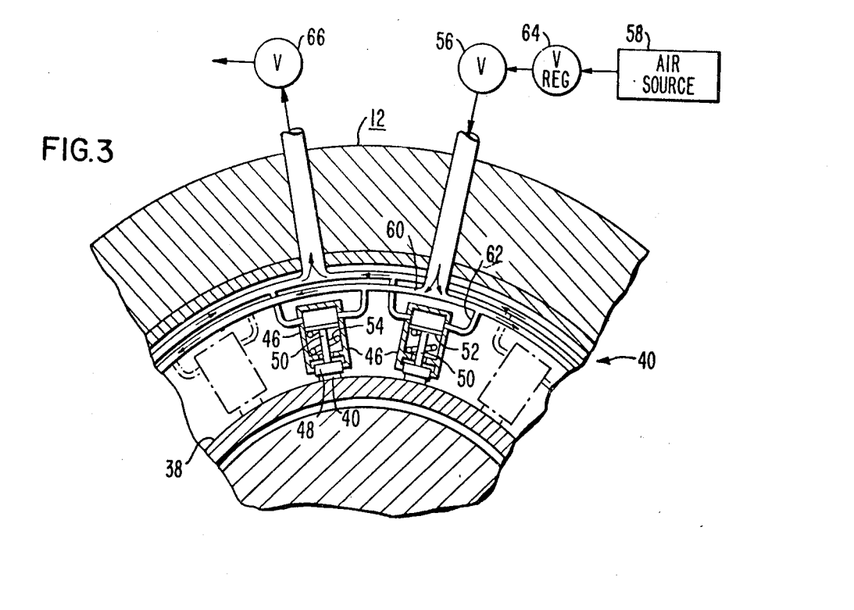
FIG. 3 is a view taken on lines 3—3 of FIG. 2 generally showing the arrangement of brush holders and brushes located near the ends of adjacent rotating modules.

The excitation coils 16 disposed along the stator length are alternately energized in opposite directions to produce the flux distribution shown in FIG. 2. Flux accordingly flows into the first sleeve, out of the second, into the third, and so on, along the machine length. Since flux is distributed in this manner, each sleeve 18 freely rotates in a direction opposite to the next adjacent sleeve. To transfer power from the rotating sleeves to machine terminals 34 and 36, slip rings 38 are mounted peripherally on each end of each rotating sleeve as shown in FIGS. 2 and 3. These slip rings are selectively contacted by current-collecting brushes 40, shown in detail in FIG. 3, positioned in the large air gap 42 located inwardly only from excitation windings 16. The brushes are supported and insulated from the stator and extend circumferentially around the stator inner surface. A stationary nonrotating intermediate conductor 44, also insulated and supported from the stator, electrically connects the brushes associated with each sleeve, thus placing all sleeves in series. The brushes ride on the copper slip rings or other compatible current collectors 38, on the peripheral surface at opposite ends of the sleeves.

Since portion 42 of the air gap is not used for transferring flux across the sleeve-stator air gap, it can be made sufficiently large to accommodate the brushholders and air piping illustrated in FIG. 3. As described hereafter, the brushes are withdrawn from contact with the slip rings during certain periods of machine operation. As shown in greater detail in FIG. 3, to effect selective retraction of each brushholder 46 and brush 40 from its corresponding slip ring 38, the brushholder body 48 is connected through connecting rod 50 to a piston 52 slidably mounted in brushholder housing 46. Spring 54 normally urges the brushholder body 48 and brush 40 out of contact with slip ring 38 when the sleeve 18 is rotating but not carrying current. When current is to be transferred to stationary intermediate conductor 44 for delivery to the rotor terminals 36, control valve 56 is opened and air from air source 58 is supplied through manifold 60 and inlet piping 62 to the top of piston 52, thus moving the brush 40 into contact with the slip ring. Pressure regulator 64 maintains constant pressure on the pistons and control valve 56 remains open during the time of energy transfer from the machine. After such transfer, valve 56 is closed, and vent valve 66 opened to vent pressure from the brushholders. Springs 54 thereupon urge piston 52 upwardly, thereby moving brushes 40 out of contact with the slip ring.

As more fully described hereafter, the brushes remain out of slip ring contact until the next cycle when energy is return to the machine. It will be understood that brushholders 46 are located in air gap 42 and extend completely around the outer peripheral surface of both slip rings on opposite ends of each sleeve. Although a pneumatic system has been disclosed for effecting actuation of the brushes relative to the slip rings, it will occur to those skilled in the art that other actuation means may be used, such as electrically operated solenoids or other devices in air gap 42 which act to move the brushes into and out of contact with the slip rings.

Figure 4:
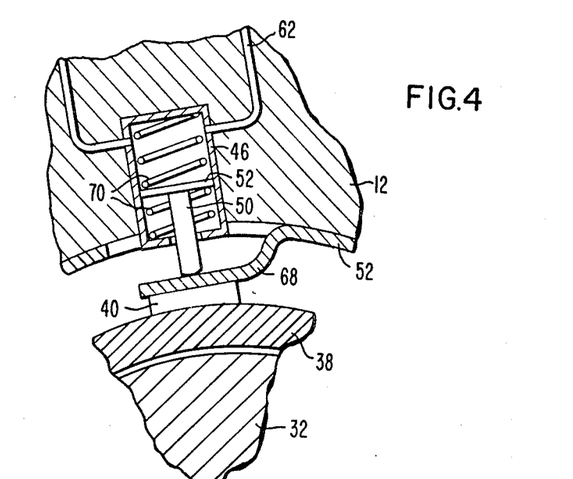
FIG. 4 is a view in elevation partly in section of a modified brush holder and brush arrangement used for transferring current from the ends of rotor modules.

FIG. 4 illustrates an alternative arrangement for lifting brushes 40 from slip ring 38. The brushes 40 are brazed or otherwise fixed on the end of a cantilever arm 68 attached to the stator 12. As in the FIG. 3 design, the brushholder 46 encloses connecting rod 50 attached to piston 52. Springs 70 on opposite sides of the piston are arranged to normally bias the brush out of contact with slip ring 40. Air supplied through inlets 60, 62 move the brush into engagement with slip ring 40 when desired. The cantilever design provides inertia and mechanical stability while eliminating the frictional effects encountered in conventional brushholders due to the electromagnetic forces on the brushes.

As shown in FIG. 2, a stationary cylindrical conductor 72 of copper is mounted on the inner peripheral surface of the stator to complete the circuit in the machine. The copper cylinder of thin wall construction, e.g., 5 centimeter wall thickness, is insulated from but secured to the bore of the stator and is directly connected to stationary sleeve 76 on one end and to stationary sleeve 78 and terminal 36 mounted in the opposite end of the machine, FIG. 1, for receiving return current from the toroidal coil 74 when current is supplied to the load coil through terminals 36. This configuration wherein the sleeves 18 rotate in opposite directions within the stator cylinder 72, with current in opposite directions, is effective in minimizing the machine inductance and the related magnetic energy loss during the energy transfer cycle. Although the conductor 72 is shown as a continuous cylinder in the stator bore, the return circuit desirably comprises a multitude of parallel conductors which are insulated from each other and transposed around the stator inner peripheral surface. This arrangement of transposing conductors to obtain uniform current distribution is well known in the art.

The intermediate conductors 44 in the machine air gap portion 42 connect the six rotor modules or sleeves 18 in series when brushes 40 contact slip rings 38, and terminate in terminals 36. The aluminum sleeve slip ring brush tracks require cladding and a more suitable material for current collection, such as copper, may be used. The combination of copper graphite brushes operating on copper slip rings has been used successfully in pulse power applications at current densities up to 5000 amperes per square inch and with 2 to 5 seconds duration per pulse. Since the time for transferring current from the machine described herein to the toroidal coil 74 is much less, i.e., 0.030 second, the current density reasonably can be increased to 10,000 amperes per square inch. At this level, each slip ring carries 1100 square inches of brush area. As an alternative, liquid metal may conveniently be used for current collection. The structure utilized for liquid metal current collection may take any one of a number of forms, e.g., the sleeve ends may be equipped with an outwardly projecting flange which rotates in a complementary cavity having liquid metal between the flange and cavity facing surfaces.

The excitation windings 16 are positioned radially outward from adjacent ends of the rotating sleeves and each winding comprises superconducting excitation coils to provide the needed high energy magnetic fields. To achieve superconductivity, the excitation coils are wound with a composite conductor preferably consisting of niobium-titanium alloy superconducting filaments embedded in a copper matrix with conventional turn-to-turn insulation and ground insulation. Since extremely low coil temperatures are required, each coil is enclosed in a dewar 80, FIG. 1, which surrounds and thermally isolates the coils which are gas-cooled, as with helium. The helium may be circulated in a closed loop either through the dead space defined by the dewar walls or directly in contact with the coil body, and an appropriate refrigeration system used to maintain the desired low temperature obviously may be used for cooling purposes. Such alloyed coil conductors of niobium-titanium cooled as described, are capable of carrying about 1,000 amperes and each winding will develop an mmf of approximately $5 \times 10^6$ ampere turns.

With the windings located on the stator and positioned relative to the rotor modules or sleeves 18 as shown, the stator and the magnetic circuit are segmented in a manner such that each excitation winding produces a magnetic field for adjacent sleeves. The alternate energization of each excitation winding causes the field to alternate in direction, i.e., inwardly and outwardly, with respect to each successive sleeve, thus producing the flux lines of FIG. 2. Also, at initial starting, with the rotor sleeves at standstill, voltage from a separate source is applied across terminals 34 and 36 to produce current flow through each successive sleeve and their interconnecting stationary conductors 44, as shown by the arrows on the sleeves in FIG. 2. Therefore, since the sleeves are connected to maintain current in a single direction, the field established by the sleeve current coacts with the field produced by the alternately energized excitation windings to cause the sleeves to rotate in opposite directions. With this arrangement, the reaction torque on rapid acceleration or deceleration is contained internally of the machine rather than being transmitted to the foundation.

As indicated above, the homopolar machine described is particularly suitable for use with nuclear fusion power plants which utilize a torus for magnetically compressing and confining plasma or gas used to develop heat for ultimate electric power generation. Basically, the machine described herein stores system energy as rotational or kinetic energy, acts as a generator to deliver the kinetic energy electrically to the toroidal compression or load coil, and upon completion of the plasma compression phase, accepts electric energy from the load coil to motorize the machine and again store kinetic energy in preparation for repetition of the cycle. Under this kind and mode of operation, when connected to the load coil, the machine operates in a capacitor mode and as such, is equivalent to a basic LC tank circuit.

Figures 5, 6A:
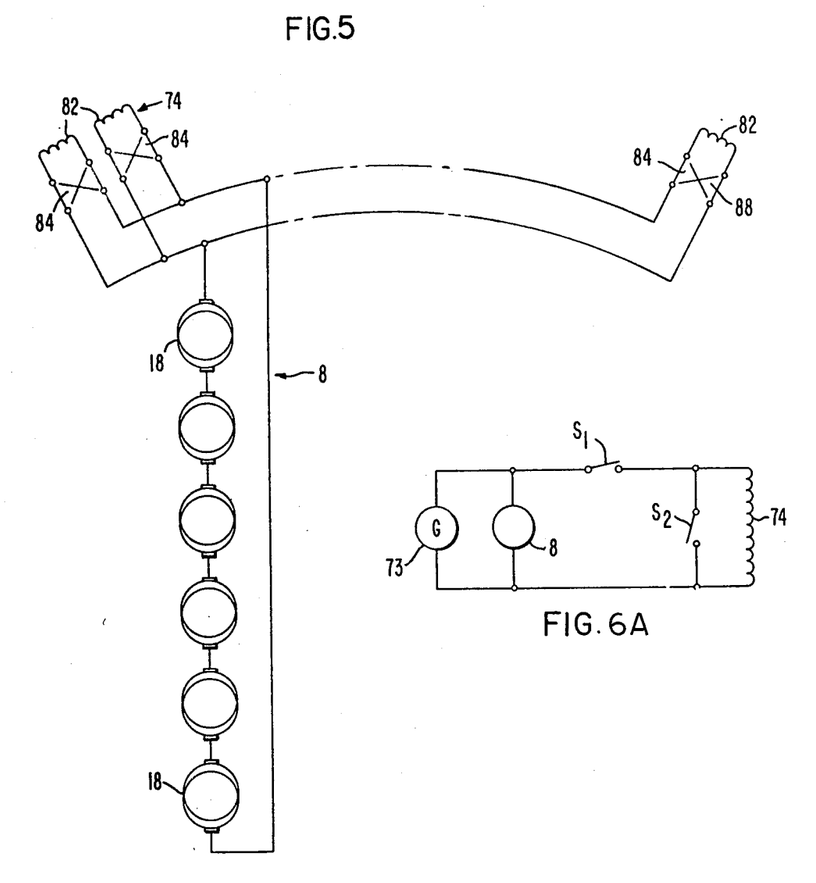
FIG. 5 is a schematic showing illustrating how homopolar machines are connected to a compression or magnetic load coil of a thermo-nuclear reactor.
FIG. 6A is a simplified showing of the fundamental circuit used for transferring system energy between homopolar machines and a magnetic load coil.

FIG. 5 schematically illustrates the general arrangement of connections of a six-module machine through suitable switches to the load coil 74. The load coil preferably is wound continuously through a full circle around a torus. The coil is divided into multiple segments 82 and each homopolar generator-motor 8 (59 total) of six modules energizes a 10 kv bus which feeds 90 compression coil segments. The coil segments are connected in parallel and are each controlled by four reversing switches 84. The current of 11.25 mega-amps supplied by the machine is therefore divided into 90 circuits with 125 kiloamps per circuit. The corresponding energy per coil segment (15 segments per meter) is 11.92 megajoules which is stored magnetically in the coil during the compression or burn portion of each cycle.

Figure 6B:
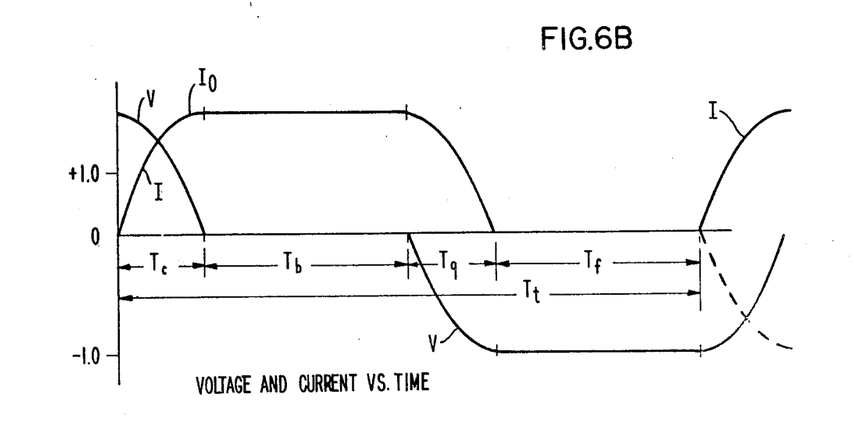
FIG. 6B shows the relationship between voltage and current during the time power is transferred between the homopolar machines and the reactor load coil.

FIG. 6A illustrates the fundamental circuit and includes the machine 8, series switch S1, load coil 74 and shunt switch S2. FIG. 6B shows the voltage and current relationships. With the machine running at 100% speed and 100% voltage, air valve 56 is opened, thus moving brushes 40 into contact with sleeve slip rings 38. Switch S1 is then closed to connect the machine to load coil 74. As shown in FIG. 6B, the current rises to its design crest value $I_0$ in time $T_C$ which according to the load coil and machine parameters is 0.030 second. As current reaches it peak, switch S2 is closed, and the current is maintained in the load coil-S2 switch circuit. The energy therefore is stored magnetically in the coil 74 for the time period $T_b$ which is 0.070 second. During the time period $T_c$ of 0.030 second, all the energy is removed from the machine, the voltage decreases to zero and sleeves 18 come to rest in less than one revolution because all energy has effectively been removed from the machine. The machine remains at rest during the compression time $T_b$.

Upon completion of compression time $T_b$, switch S2 is opened and current is transferred during time $T_q$ from the load coil to the machine via terminals 34, 36 and the cylindrical conductor 72 located in the bore of the stator. This current then coacts with the field from constantly energized excitation windings 16 and accelerates the individual sleeves in opposite directions. Since some losses will occur during the cycle, the slight diminution of energy returned to the machine is made up or supplemented by adding energy from a separate power source 73 during the time $T_f$. Since this energy is added at a relatively low rate, only a few brushes 40 may be placed in contact with the slip rings 38 instead of all brushes to supplement the return energy. The frictional drag which otherwise would be placed on the rotor by the complete set of brushes contacting the sleeve slip rings is eliminated thus imparting greater efficiency to the system. At the end of this phase, air is vented from the brushholders and springs 54 move brushes 40 away from the slip rings.

It is expected that compression coil 74 will be pulsed about every ten seconds and this time is more than adequate to re-accelerate the rotating sleeves up to the desired voltage and speed.

It has been determined that losses in the system with a pulse repetition rate of 1 every 10 seconds is 5.18% of the energy transferred. This includes the homopolar machine losses and the switch losses which together count for nearly 5% of the total. Transmission loss has been included for the voltage drop in the interconnecting cable and bus work as well as the energy input for the refrigeration associated with the superconducting field windings.

The losses for each category are summarized below:

| ENERGY LOSS PERCENT PER CYCLE | |
|---|---|
| Homopolar Machines | 3.42 |
| Switches | 1.56 |
| Transmission | .1 |
| Refrigeration | .1 |
| Total System | 5.18 |

In pulse power applications, and specifically where the stored rotational energy is equal to the electrical energy to be transferred in time T, the minimum loss in the rotor will be realized if 100% of the rotating mass can be utilized as an efficient electrical conductor. This is substantially accomplished in the present invention by utilizing all of the cylindrical sleeves comprising each rotor module, as the conductor.

Figure 7:
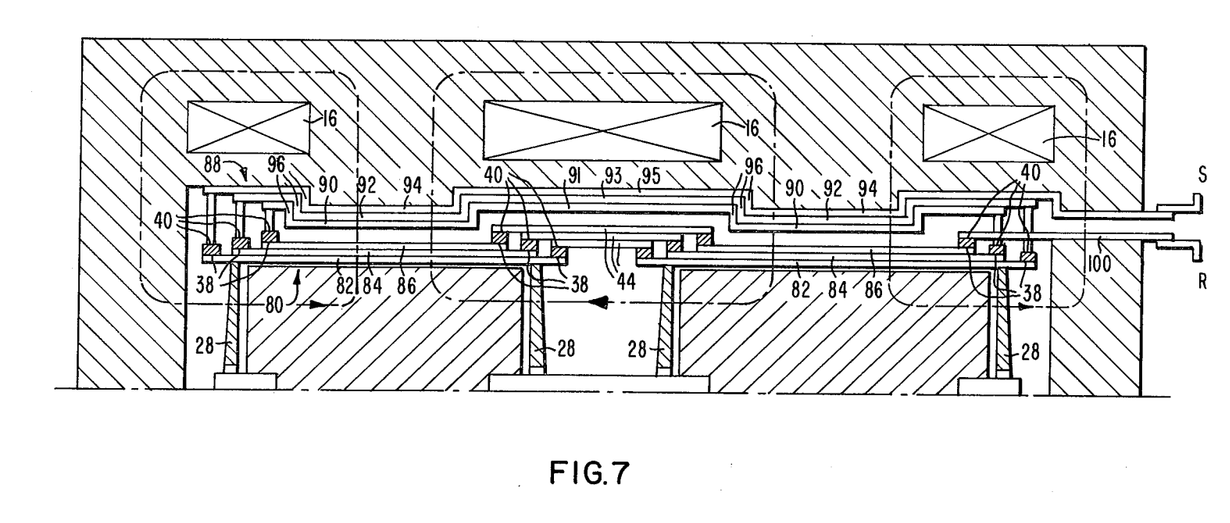
FIG. 7 is a modification which illustrates a multiple turn machine made in accordance with the teachings of this invention.

In the design of the single-turn machine described above wherein the rotor constitutes a single sleeve conductor connected through a slip ring and brushes to the single return conductor on the stator, the voltage developed is a function of active conductor length, magnetic field and angular rotor velocity. The modification of FIG. 7 illustrates a construction particularly designed to provide a greater voltage output than the design of FIGS. 1-6. The magnetic and electrical design is similar to the basic machine of FIGS. 1-6 except that multiple turns are used in this modification to obtain higher values of voltage but with a decrease in current.

Referring to FIG. 7 which schematically shows the modified design, instead of having each rotating element 18 in the rotor comprise a single sleeve conductor, multiple concentric sleeves 80 are assembled to form each of the rotating elements which constitute the complete rotor. An identical number of similar cylindrical conductors are positioned on the internal surface of the stator and are respectively and selectively connected to the rotor conductors through brushes and slip rings. In the FIGS. 1-6 design, the rotor may consist of a number of oppositely rotating elements positioned in axial alignment along the machine length. In this modification shown in FIG. 7 however, each rotating element includes a number of concentrically disposed hollow conducting sleeves, the inner sleeve 82 of which is supported on arms 28 in the manner previously described. The ends of each sleeve are equipped with slip rings 38 and brushes 40 also in the manner previously described. The design of the slip rings and brushes are such that the brushes are arranged to be selectively placed in contact with the slip rings during the time current is either transferred from or returned to the machine. The design used for moving the brushes relative to the slip rings is the same as that previously disclosed.

After the first sleeve 82 is mounted on arm 28, the outer surface thereof is covered with turn-to-turn electrical insulation, such as resin-treated glass tape. The next outer sleeve 84 is then placed concentrically thereover, followed by electrical turn-to-turn insulation, and then a third sleeve is placed over sleeve 84, and so on until the desired number of sleeves are assembled to form a rotating element. It is evident that all rotating elements comprising the rotor contain the same number of sleeves. After the sleeves are assembled in the manner described, the resin in the electrical insulation is cured to form a firm bond between the concentrically disposed cylinders while still providing an effective dielectric which electrically isolates each individual sleeve from the next underlying one. Key and slot arrangements may supplement the bonding effect of the resin.

The return conductor on the stator is similarily assembled. Instead of utilizing a single return conductor on the stator as in the FIGS. 1-6 design, a number of conductors 88 preferably in the form of concentrically disposed cylinders 90, 92 and 94 with turn-to-turn insulation therebetween are assembled in the stator cavity. These conductive cylinders are located radially outward from the rotating elements, extend throughout the stator length, and are equal in number to the concentrically disposed sleeves in each rotating element. It will be apparent that where steps appear in the stator return conductor to accommodate the nonrotating intermediate conductor 44, appropriately sized rings 96 having their axis on the same axis as the rotor, are used for connecting one group of cylinders, such as 90, 92, 94 to the next adjacent cylinders 91, 93, 95 in a manner which will be obvious to those skilled in the art.

Since the objective of the design is to increase the voltage of a machine of a given size, magnetic field strength and angular rotor velocity, multiple turns are used to obtain the higher voltage but with decreasing current. The multi-turn machine is wound by having multiple turns connected along their length through the slip rings 38 and brushes 40. Each turn requires the minimum of a pair of slip rings and current collectors in the form of brushes, and is composed of a half-turn on the rotor with the other half returning through the stator. These turns are connected in series and the current path through the machine includes the terminal R, stationary sleeve 100, and axially along the sleeves 82 on the rotating elements and interconnecting brushes to the row of brushes at the far end of the machine. These brushes are then connected to the inner cylinder 90 of the return conductor on the stator and the current is carried axially in that conductor towards the terminal end on the right side of the machine where it is transferred to the second sleeve 84 on the rotor. It is carried along the rotor to the opposite end and transferred through the brushes to the second cylinder 92 of the return conductor. This process is repeated for each rotor sleeve and stator cylinder until current finally emerges from the most outer cylinder, e.g., cylinder 94, of the return conductor to the terminal marked S.

The FIGS. 1-6 design of single-turn machine develops a voltage which is a function of the active conductor length, magnetic field and angular rotor velocity. The multi-turn machine serves to increase the voltage in proportion to the number of turns or conductor passes through the machine. The particular arrangement described will furnish three times the voltage since the voltage varies directly with the number of turns, and about ⅓ current since the current is inversely proportional to the number of turns. A major benefit derived from using the multi-turn machine is that the number of turns can be selected to obtain a voltage and current output which will match the volt-amp characteristics of a connected load. The multi-turn design therefore provides a degree of freedom beyond that obtainable in single-turn machines.

As indicated previously, the magnetic and electrical design is essentially the same as the single-turn machine described in FIGS. 1-6, except multiple turns are used to obtain higher voltage values but the current is decreased. The brush-lifting arrangement in the multi-turn machine is the same as that previously described in relation to FIGS. 1-6.

It will be apparent that many modifications and variations are possible in light of the above teachings. It is therefore to be understood that within the scope of the appended claims, the invention may be practiced other than as specifically described.

What is claimed is:

1. A homopolar generator-motor comprising:
   a base supporting a stator and a rotor arranged to rotate therein;
   said rotor comprising multiple modular hollow sleeves supported by internal arms extending radially outward from hubs centrally positioned in opposite ends of each sleeve;

sleeve support means extending upwardly from said base on which each of said hubs are respectively mounted to permit independent sleeve rotation;

means connecting a terminal to an end of one of said sleeves;

nonrotating conductors between the ends of adjacent sleeves;

current-collecting means supported on but insulated from said stator;

said current-collecting means separately connecting the ends of said rotatable sleeves with said nonrotating conductors to thereby provide a series connection in said rotor including the sleeves and nonrotating conductors when the current-collecting means engages their respective sleeves;

stationary conductor means extending the length of said stator and being mounted on but electrically insulated from the stator inner surface, a terminal on one end of the stationary conductor means located adjacent the sleeve terminal, and interconnecting means connecting the other end of said stationary conductor means on the stator to the corresponding sleeve on the end of the rotor;

excitation means on said stator for providing a magnetic field which links said sleeves and generates a voltage therein during sleeve rotation; and means for connecting said terminals to an inductive load;

whereby during the first part of a transfer cycle, kinetic energy developed in said rotatable sleeves is electrically transferred to said load, and during the second part of the cycle, electrical energy returned from the load establishes a second magnetic field which links the sleeves and coacts with the excitation means magnetic field to accelerate the rotatable sleeves and thereby create kinetic energy therein for repetition of the transfer cycle.

2. The homopolar generator-motor according to claim 1 wherein each hollow rotatable sleeve on the rotor comprises multiple concentrically disposed cylinders having insulation between each layer of cylinders and slip rings on the opposite ends thereof; and each nonrotating conductor in the air gap between the ends of adjacent sleeves comprises multiple layers of conductors, and the current-collecting means which connects each sleeve to its nonrotating conductor includes multiple current-collecting means which respectively connects each cylinder and its slip rings to a corresponding nonrotating conductor in the air gap; and said stationary conductor means on the stator comprises multiple layers of conductor means insulated from each other and equal in number to said cylinders, and said interconnecting means includes means separately connecting each conductor layer respectively to its corresponding cylinder at opposite ends of the rotor, and a terminal on the last layer of conductor means; and wherein the terminal on one of said sleeves is connected to a cylinder;

whereby when the current-collecting means engages said slip rings on the cylinders, a series circuit is established which includes said terminal on said cylinder and the outer layers of cylinders, nonrotating conductors in the air gap, interconnecting means and conductor means on the stator, and the next layers of these components in succession and the terminal on the last layer of conductor means on the stator which thereby provides multiple conductor turns in the generator-motor to achieve desired values of voltage and current during operation.

3. The homopolar generator-motor according to claim 1 wherein each hollow rotatable sleeve includes at least two hollow cylinders concentrically disposed with respect to each other and having insulation therebetween which electrically separates said cylinders but mechanically bonds them together thereby permitting the cylinders to rotate as a single element; and said stationary conductor means on the stator includes at least two conductors mounted on and insulated from the stator, electrical insulation between said conductors; and current-collecting means supported from the stator and arranged to selectively connect the outermost cylinders on the rotor in series;

first interconnecting means connecting an end of one of said cylinders with a first conductor on the stator to provide a complete turn in the machine; and second interconnecting means connecting the first conductor with the next layer of cylinders on the rotor, and means connecting said next layer of cylinders on the rotor to the second conductor on the stator, and terminals connected so as to provide multiple conductor turns in the machine to achieve desired values of voltage and current.

4. The homopolar generator-motor according to claim 1 wherein each of said rotating hollow sleeves comprising the rotor includes at least inner and outer hollow sleeves concentrically disposed with respect to each other and having electrical insulation therebetween;

selectively operable first and second connecting means in the air gap respectively connecting the inner sleeves on the rotor in series, and for connecting the outer sleeves on the rotor in series; and said stationary conductor means mounted on the stator inner surface comprises at least two cylinders separated from each by electrical insulation; and current-collecting means connecting the end of the outer layer of series connected sleeves on the rotor to a first cylinder on the stator, and separate current-collecting means connecting the other end of the stator cylinder to the inner layer of series connected sleeves on the rotor, and current-collecting means connecting the inner layer of series connected sleeves to the second cylinder on the stator, and then to the stationary conductor means terminal which is connected to the second cylinder on the stator;

thereby providing multiple conductive turns in the machine which furnishes voltage and current values in proportion to the number of turns in the machine.

5. The homopolar generator-motor according to claim 1 wherein each of the multiple rotating elements comprising the rotor consists of multiple concentrically disposed sleeves arranged in layers and separated from each other by electrical insulation;

current-collecting means arranged to selectively connect sleeves in the same layer on each rotating element in series to thereby provide multiple half-turns on said rotor;

said stationary conductor means mounted on and extending the length of said stator includes multiple conductors arranged in layers equal to the number of sleeves and separated from each other by electrical insulation whereby each such layer represents a half-turn on the stator, and a terminal on the end of one of said conductors located adjacent a terminal connected to one of the sleeves on said rotor;

current-collecting means respectively connecting each layer of the series connected sleeves in the rotating elements to the corresponding conductor on the stator which comprises the conducting means on said stator; and means on the other end of the generator-motor respectively connecting the layers of multiple conductors on the stator with said corresponding layers of sleeves on the rotor to thereby provide a series connected path from the outer sleeves on the rotor to the inner conductor layer on the stator, and then from the inner conductor layer on the stator to a second layer of series connected sleeves on the rotor, and from there to a second conductor layer on the stator, and so on through a predetermined number of layers of series connected sleeves on the rotor and a corresponding number of conductor layers on the stator to ultimately provide a voltage and current output which will match the volt-amp characteristics of a connected load.

* * * * *